United States Patent
Ashton et al.

(10) Patent No.: US 7,828,246 B2
(45) Date of Patent: Nov. 9, 2010

(54) WING WITH SECTIONED TUBULAR MEMBERS

(75) Inventors: Larry J. Ashton, Mapleton, UT (US); Michael G. Allman, Spanish Fork, UT (US); Troy L. White, Goshen, UT (US); Danny L. Stark, Mapleton, UT (US)

(73) Assignee: Spectrum Aeronautical, LLC, Carlsbad, CA (US)

( * ) Notice: Subject to any disclaimer, the term of this patent is extended or adjusted under 35 U.S.C. 154(b) by 309 days.

(21) Appl. No.: 11/855,357

(22) Filed: Sep. 14, 2007

(65) Prior Publication Data

US 2009/0072088 A1  Mar. 19, 2009

(51) Int. Cl.
  *B64C 1/06* (2006.01)
(52) U.S. Cl. .................................... 244/124; 244/123.9
(58) Field of Classification Search .............. 244/123.1, 244/123.14, 123.3, 124, 123.7, 123.8, 123.9, 244/131, 35 R; 416/362, 233, 226
  See application file for complete search history.

(56) References Cited

U.S. PATENT DOCUMENTS

| | | | | |
|---|---|---|---|---|
| 1,930,285 A * | 10/1933 | Robinson | ..................... | 138/143 |
| 3,048,033 A | 8/1962 | Melzer | | |
| 3,228,822 A * | 1/1966 | Norman | ..................... | 428/188 |
| 4,079,903 A * | 3/1978 | Ashton et al. | ............. | 244/123.5 |
| 4,120,998 A * | 10/1978 | Olez | .......................... | 428/33 |
| 4,206,895 A * | 6/1980 | Olez | ....................... | 244/123.3 |
| 4,481,817 A | 11/1984 | Ludowyk et al. | | |
| 4,565,595 A * | 1/1986 | Whitener | ..................... | 156/156 |
| 4,789,577 A * | 12/1988 | Leone et al. | ................ | 428/34.5 |
| 5,332,178 A * | 7/1994 | Williams | .................. | 244/123.3 |
| 5,469,686 A | 11/1995 | Pykiet | | |
| 5,496,002 A * | 3/1996 | Schutze | .................... | 244/123.3 |
| 5,888,608 A * | 3/1999 | Tsai | ........................... | 428/105 |
| 6,182,929 B1 | 2/2001 | Martin et al. | | |
| 6,237,873 B1 * | 5/2001 | Amaoka et al. | .......... | 244/123.7 |
| 6,482,497 B1 | 11/2002 | Kay et al. | | |
| 6,513,757 B1 * | 2/2003 | Amaoka et al. | .......... | 244/123.7 |
| 6,561,459 B2 * | 5/2003 | Amaoka et al. | .......... | 244/123.7 |
| 6,655,633 B1 * | 12/2003 | Chapman, Jr. | ........... | 244/123.9 |
| 6,743,504 B1 * | 6/2004 | Allen et al. | .................. | 428/362 |
| 6,746,755 B2 * | 6/2004 | Morrison et al. | ............ | 428/166 |
| 6,889,937 B2 | 5/2005 | Simpson et al. | | |
| 7,063,763 B2 * | 6/2006 | Chapman, Jr. | .............. | 156/175 |
| 7,252,324 B1 * | 8/2007 | Nahm et al. | ............. | 296/180.1 |
| 2004/0079838 A1 | 4/2004 | Simpson et al. | | |
| 2005/0001093 A1 * | 1/2005 | Hayashi | ................... | 244/17.17 |
| 2005/0211843 A1 | 9/2005 | Simpson et al. | | |

* cited by examiner

*Primary Examiner*—Joshua J Michener
(74) *Attorney, Agent, or Firm*—Nydegger & Associates

(57) ABSTRACT

An aircraft wing made of a composite material, and its method of manufacture, require a plurality of kabobs (i.e. substantially rectangular shaped hollow tubes having an open end and a closed end). Of these kabobs, several are aligned end-to-end, to create a section. Several sections are then positioned side-by-side and covered by a layer of composite material to define an aerodynamic surface for the wing. The juxtaposed sections also establish spar webs for the wing, and the closed ends of the juxtaposed sections establish transverse ribs for the wing. Thus, the kabobs form the main load-bearing member of the wing. The sections of composite material are co-cured with the composite material of the aerodynamic surface.

4 Claims, 2 Drawing Sheets

WING WITH SECTIONED TUBULAR MEMBERS

FIELD OF THE INVENTION

The present invention pertains generally to structures that are made of composite materials, and to the methods for manufacturing these structures. More particularly, the present invention pertains to structures that incorporate a plurality of individual composite material components, and to the methods of incorporating these components into a unified structure. The present invention is particularly, but not exclusively useful as an aircraft wing having a desired airfoil configuration, and to the methods for manufacturing such a wing using composite materials.

BACKGROUND OF THE INVENTION

In the manufacture of a wing for an aircraft, the airfoil configuration that is intended for the wing must first be determined. A wing structure that will support this configuration is then manufactured. Typically, such a wing structure is of a so-called semimonocoque construction, and includes both an external aerodynamic surface and an internal support frame. More specifically, a cover, or skin, provides the aerodynamic surface (i.e. the airfoil) for the wing, and a combination of transverse ribs and spar webs make up the internal support frame. Together, the cover (skin), the transverse ribs and the spar webs are structurally interconnected to provide the strength and resilience that is required by the wing for the aircraft's intended flight envelope.

For the conventional construction of an aircraft wing, the internal support frame is normally made of wood, or aluminum, or a combination of these materials. On the other hand, the covers (skins) are normally made of aluminum or a lacquered fabric. For most wing configurations, hollow spaces in the frame (i.e. spaces under the skin and inside the wing) are used to hold bladders that will function as fuel cells for the aircraft.

When compared with the above-mentioned construction materials (i.e. wood, aluminum, lacquered fabric), composite materials (e.g. carbon fiber and epoxy resin) offer a lighter-weight alternative. Moreover, for the manufacture of an aircraft wing, it is known that composite materials can be formed to provide strength characteristics that are similar to those of other aircraft construction materials. Although composite materials are most effectively and efficiently manufactured as layers of the material, an aircraft wing is obviously not simply a layer of material.

If composite materials are used for the construction of an aircraft wing, it is evident that different layers of composite material must somehow be pre-formed into an intended shape. More specifically, it may also be necessary to form these layers into individual components that can then be subsequently arranged and assembled to establish the shape of the structure. Further, in order to maximize the structural strength of this intended shape, it is preferable that these components be co-cured with each other.

In light of the above, it is an object of the present invention to provide an aircraft wing wherein its support frame and its airfoil shape are essentially made of only composite materials. Another object of the present invention is to provide a method for pre-forming composite materials into a desired airfoil configuration for an aircraft wing, and a compatible method for co-curing these materials for the manufacture of the wing. Another object of the present invention is to provide a method for manufacturing an aircraft wing that is relatively simple and easy to implement and that is comparatively cost effective.

SUMMARY OF THE INVENTION

In accordance with the present invention, an aircraft wing is manufactured using only composite materials. Specifically, various components of the wing are pre-formed of composite materials. These components are then assembled and co-cured to manufacture the wing. Of most importance in this manufacture is the construction of the main load-bearing member, and its support frame, that will effectively support the lift force provided by the wing.

For the present invention, the main load-bearing member of the wing is made using a plurality of components that are referred to herein as "kabobs". More particularly, each kabob is an elongated hollow tube having a generally rectangular cross section. Further, each kabob has an open end and a closed end. In the assembly of the load-bearing member, several kabobs (e.g. three) are aligned in an end-to-end relationship, with the closed end of a kabob inserted into the open end of another to create a section. Several sections are then juxtaposed in a side-by-side relationship to create a support frame for the load-bearing member. With this arrangement, the juxtaposed sections establish spar webs. And, juxtaposed closed ends of respective kabobs in the sections establish transverse ribs for the wing.

In more detail, each kabob is individually pre-formed as an individual component for the load-bearing member. To do this, a mandrel is selected that has the desired cross section for the kabob. Although each kabob will most likely have its own unique dimensions, all kabobs are essentially manufactured in the same manner. Specifically, a layer of thermoplastic material (e.g. PETG) is first wrapped onto the mandrel. Two plies of composite material (+45° and −45°) are then used to cover the layer of thermoplastic material. As implied above, thermoplastic and composite materials are also positioned over the end of the mandrel to create the closed end for the kabob. The composite and thermoplastic materials are then co-cured on the mandrel at a temperature in a range between 225-250° F., for about one hour to create the kabob.

When removed from the mandrel, the resultant kabob is dimensioned and appropriately tapered for assembly with other kabobs, for manufacture of a support frame for the load-bearing member. During this assembly, the load-bearing member is configured so it will define a portion of an aerodynamic surface for the airfoil of the wing. Further, because the thermoplastic material allows the kabobs to be used as fuel cells, the closed ends of the various kabobs are preferably formed with a hole. This allows the closed ends to act as baffles so fuel can move between fuel cells without excessive sloshing.

For the manufacture of a load-bearing member in accordance with the present invention, the kabobs function as tools, in addition to their function as structural components of the load-bearing member. For both functions, the kabobs are juxtaposed as disclosed above, and positioned between layers of composite material. At this point, additional layers of structural foam can also be selectively incorporated with the layers of composite material. Further, if desired, the spar webs of the load-bearing member can also be reinforced with this structural foam. The purpose here is to have the structural foam provide additional strength for these elements of the load-bearing member. Preferably, the structural foam used for this purpose is of a type commercially available as Roahcell (⅛ inch). In any event, when assembled, the layers of composite material establish an inside mold line (IML) for the load-bearing member. The mold in which the assembled components of the load-bearing member are placed establishes the outer mold line (OML).

As indicated above, the components made of composite material are co-cured, inside the mold. As intended for the present invention, this co-curing is accomplished using the kabobs as tools. Specifically, in this capacity, the interior of the kabobs are pressurized with a pressure in a range between 30 psi and 100 psi (preferably, about 90 psi). While pressurized, the kabobs, the layers of composite material and structural foam are cured together at a temperature of about 275° F. for approximately two hours.

After the load-bearing member has been manufactured, other components of the aircraft wing can be mounted or appropriately attached to the load-bearing member. Specifically, a leading edge for the wing can be attached. Also, a pre-configured wing tip can be attached. Further, control surfaces such as ailerons and flaps can be added as part of the trailing edge of the wing.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
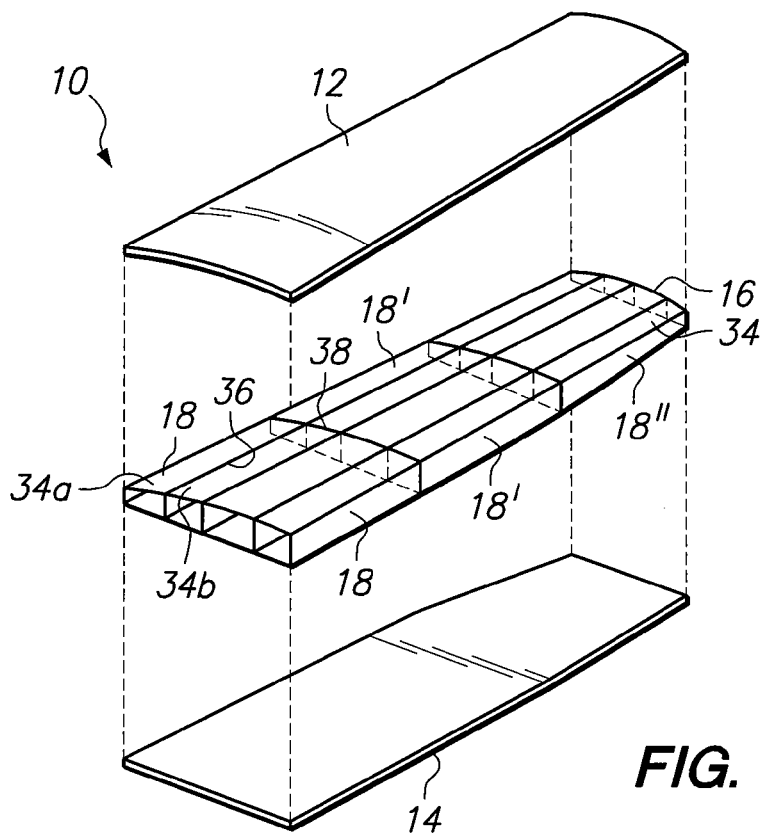
FIG. 1 is an exploded perspective view of a load-bearing member for an aircraft wing in accordance with the present invention.

Referring initially to FIG. 1, a load-bearing member for an aircraft wing is shown and is generally designated 10. In FIG. 1 it will be seen that the load-bearing member 10 includes a top cover 12 and a bottom cover 14, with a support frame 16 positioned between the two covers 12/14. As intended for the present invention, all of these components are made of a same composite material (preferably carbon fibers and epoxy resin), and all are co-cured with each other. Importantly, the dimensions and configurations of the various components of load-bearing member 10 are determined so that, in combination, they are compatible with the structural and aerodynamic requirements of a desired airfoil. For the present invention, the top cover 12 and bottom cover 14 are essentially layers of composite material that are pre-fabricated. The covers 12/14, however, may include structural foam that is selectively added to provide additional structural strength. Preferably, this structural foam is of a type that is commercially available as Roahcell (⅛ inch). The construction of support frame 16 will be best appreciated with reference to FIG. 2.

Figure 2:
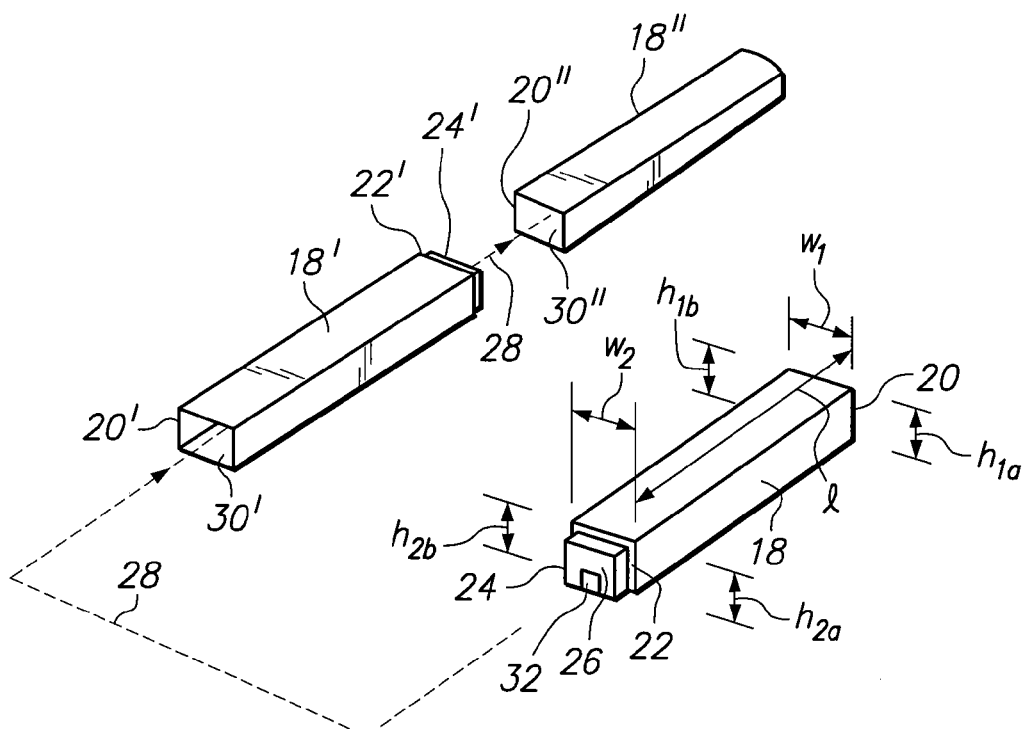
FIG. 2 is an exploded perspective view of a plurality of kabobs positioned for assembly as a section.

In FIG. 2, a kabob 18 is shown, together with similar kabobs 18' and 18". For disclosure purposes, the kabob 18 is discussed in detail. As shown, the kabob 18 has an open end 20 and a closed end 22. Thus, the kabob 18 is a tube-like structure having a substantially rectangular cross section with a hollow interior extending between the ends 20 and 22. Dimensionally, the open end 20 of kabob 18 is shown to have a width $w_1$ with a height of $h_{1a}$ on one side, and a height of $h_{1b}$ on the other side. Similarly, the closed end 22 of kabob 18 is shown to have a width $w_2$ with a height of $h_{2a}$ on one side, and a height of $h_{2b}$ on the other side. As will be appreciated by the skilled artisan, the dimensions $w_1$, $h_{1a}$, $h_{1b}$, $w_2$, $h_{2a}$, and $h_{2b}$ for kabob 18 are determined by configuration requirements of the load-bearing member 10. Importantly, although the dimensions can be varied, the cross section area of open end 20 needs to be greater than the cross section area of closed end 22. This is so, not only for design purposes, but to also allow the mandrel (not shown) on which the kabob 18 is formed to be removed from the kabob 18. For an alternate embodiment of the kabob 18, its open end 20 can include a barrier (not shown) that would effectively make the kabob 18 a substantially closed hollow structure. If employed, the barrier may be recessed from the end 20 so the end 20 can be engaged with another kabob 18 in a manner as disclosed immediately below.

Still referring to FIG. 2, the closed end 22 of kabob 18 is shown to include an extension 24. Specifically, the extension 24 includes an end plate 26 that is located a short distance from the end 22. The end plate 26 also has slightly reduced height and width dimensions, compared to those of the closed end 22 (i.e. $w_2$, $h_{2a}$ and $h_{2b}$). Functionally, as indicated by arrow 28, the extension 24 on kabob 18 is dimensioned to fit into the opening 30' of the open end 20' of kabob 18'. Similarly, the extension 24' at closed end 22' of kabob 18' is dimensioned to fit into the opening 30" at open end 20" of kabob 18". As an aside, it is noted that the endplate 26 of extension 24 on kabob 18 is formed with a hole 32 (note: extension 24' on kabob 18' can have a similar hole 32). In any event, when the kabobs 18, 18' and 18" are aligned in an end-to-end relationship, as shown in FIG. 1, they collectively create a section 34.

Returning to FIG. 1, it will be appreciated that the sections 34a and 34b are, in all important respects, similar to the section 34. And, they are constructed in a manner similar to that discussed above for the section 34. With this in mind, and referring specifically to the sections 34a and 34b, it will be seen that when the sections 34a and 34b are juxtaposed in a side-by-side relationship, they establish and define important structural aspects of the support frame 16. In particular, the interface between the sections 34a and 34b defines a spar web 36 for the support frame 16. At the same time the interface between the respective kabobs 18 and 18' of the sections 34a and 34b partially defines a transverse rib 38. Carried further, any two side-by-side sections 34 will define the same or similar structures for support frame 16. Further, if desired, the spar webs 36 can be reinforced with structural foam to provide added strength.

Figure 3:
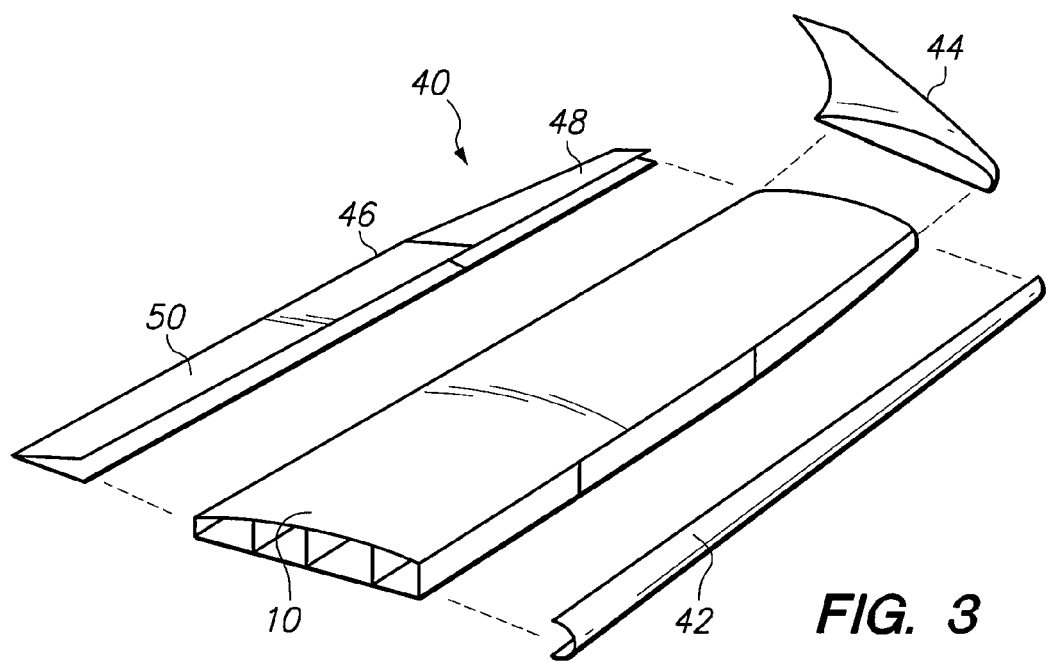
FIG. 3 is an exploded perspective view of the assembled load-bearing member together with other components of the wing.

Referring now to FIG. 3, it will be seen that the assembled load-bearing member 10 is an integral part of an aircraft wing, generally designated 40. As shown, in addition to the load-bearing member 10, the wing 40 will include a leading edge 42, a wing tip 44, and a trailing edge 46 that includes an aileron 48 and a flap 50. As will be appreciated by the skilled artisan, the additional components (i.e. leading edge 42, wing tip 44 and trailing edge 46) can be mounted or affixed to the load-bearing member 10 in any manner well known in the pertinent art. Further, these additional components (i.e. leading edge 42, wing tip 44 and trailing edge 46), like the load-bearing member 10, can all be made of composite materials.

The curing of the kabobs 18 and the curing of the load-bearing member 10 are accomplished in somewhat dissimilar processes. Specifically, for the load-bearing member 10, the components to be cured are placed into a mold (not shown) and heated at a predetermined temperature, for a predetermined time duration. In the case of the load-bearing member 10, the kabobs 18 are also pressurized inside the mold. On the other hand, the kabobs 18 are cured while still on a mandrel.

In detail, each kabob 18 is made by first wrapping a layer of thermoplastic material onto a mandrel. The thermoplastic material is then covered with a composite material that is preferably made as a two-ply (−45° and +45°) layer. The closed end 22 of kabob 18, with its extension 24, is also formed at this time. The thermoplastic material and the composite material are then co-cured at a temperature in a range between 225-250° F., for about one hour. The resultant kabob 18 is then removed from the mandrel and used for the subsequent assembly of the support frame 16.

For the manufacture of the load-bearing member 10, a bottom cover 14 is placed in a mold (not shown). A plurality of kabobs 18 are placed on top of the bottom cover 14 and are aligned in an end-to-end relationship to create a section 34. In this alignment, as disclosed above, a closed end 22 of one kabob 18 is received into the open end 20 of another kabob 18 to create the section 34. A plurality of sections 34 is thus arranged in a side-by-side relationship to establish a desired configuration for the support frame 16. The top cover 12 is then laid down on the support frame 16. With this arrangement, juxtaposed sections 34 establish spar webs 36 for the support frame 16, and juxtaposed closed ends 22 of respective kabobs 18 establish transverse ribs 38 for the support frame 16.

Figure 4:
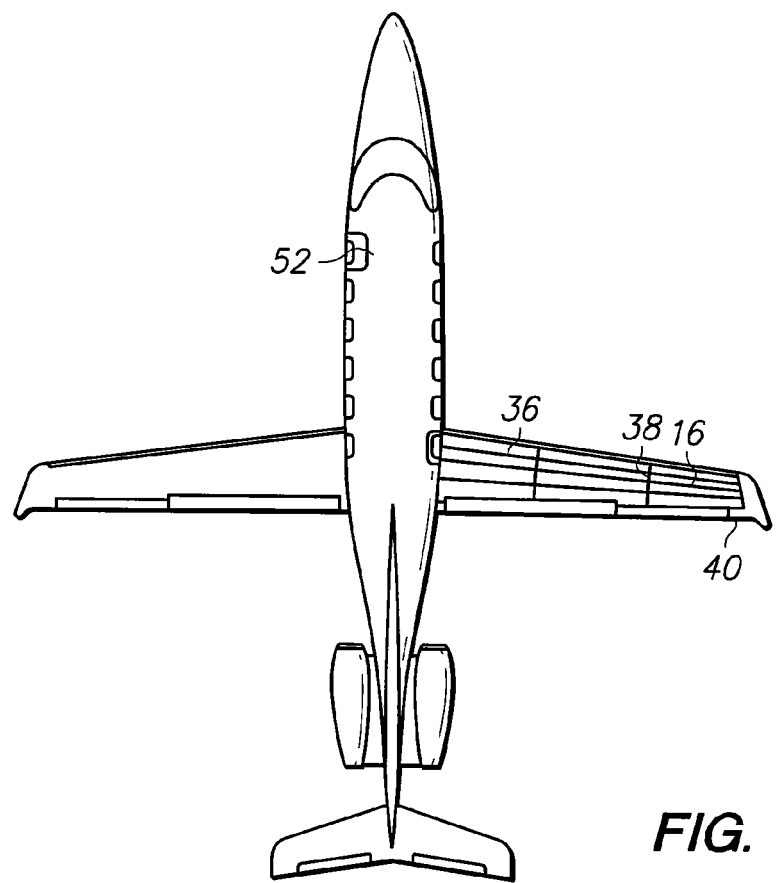
FIG. 4 is a top view of an aircraft, with portions broken away, to reveal the location of the load-bearing member in the aircraft wing.

Once the components of the load-bearing member 10 have been assembled in the mold, the mold is closed and the interior of the kabobs 18 (sections 34) are pressurized with a pressure in a range between 30 psi and 100 psi (preferably 90 psi). All components of the load-bearing member 10 are then co-cured at a temperature of about 275° F., for approximately two hours. The wing 40 can then be assembled and affixed to an aircraft 52, as shown in FIG. 4.

While the particular Flyaway Kabobs as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An aircraft wing with a load bearing structure, wherein the load bearing structure comprises:
    a plurality of longitudinal sections juxtaposed in a side-by-side relationship to establish a surface for the wing and to define a front edge and a back edge for the load bearing structure;
    each longitudinal section comprises:
        a plurality of kabobs aligned in an end-to-end relationship, wherein each kabob is made of a composite material and wherein each kabob is an elongated hollow tube having a substantially rectangular cross section, and having an open end and a closed end with a predetermined taper therebetween;
    wherein juxtaposed sections establish spar webs for the structure and juxtaposed closed ends of respective kabobs establish transverse ribs for the structure; and
    a layer of composite material positioned on the surface to create a portion of an airfoil for the wing.

2. A wing as recited in claim 1 wherein each kabob defines a lumen and the kabob comprises:
    a layer of thermoplastic material surrounding the lumen; and
    a layer of composite material covering the thermoplastic material opposite the lumen.

3. A wing as recited in claim 2 wherein the thermoplastic material is Polyethylene Terephthalate Glycol (PETG) and the composite material is made of carbon fibers and epoxy resin.

4. A wing as recited in claim 1 further comprising:
    an airfoil leading edge affixed to the front edge of the load bearing structure; and
    an airfoil trailing edge affixed to the back edge of the load bearing structure.

* * * * *